Jan. 31, 1939. D. W. VOORHEES, JR 2,145,673
METHOD OF MAKING A METAL WHEEL
Filed Sept. 3, 1935 2 Sheets-Sheet 2
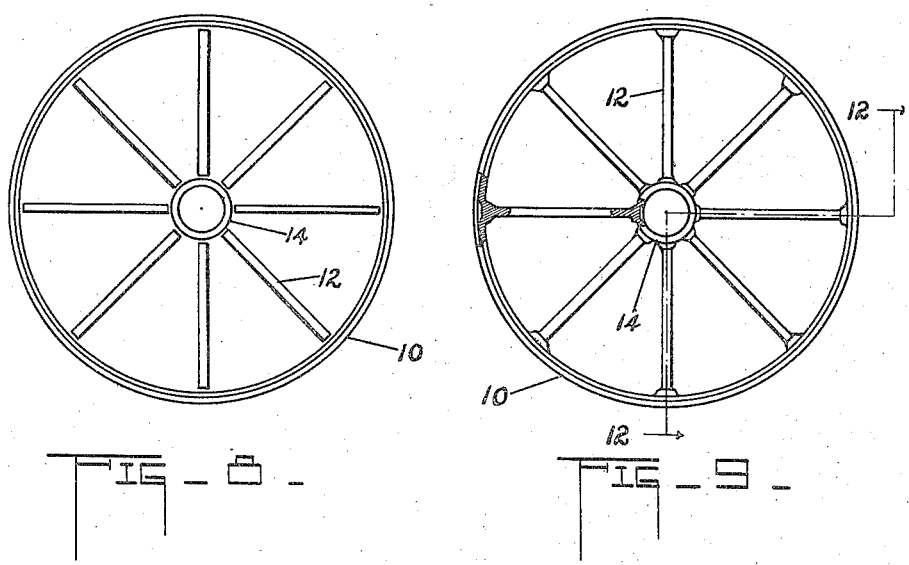
FIG-8- FIG-9-
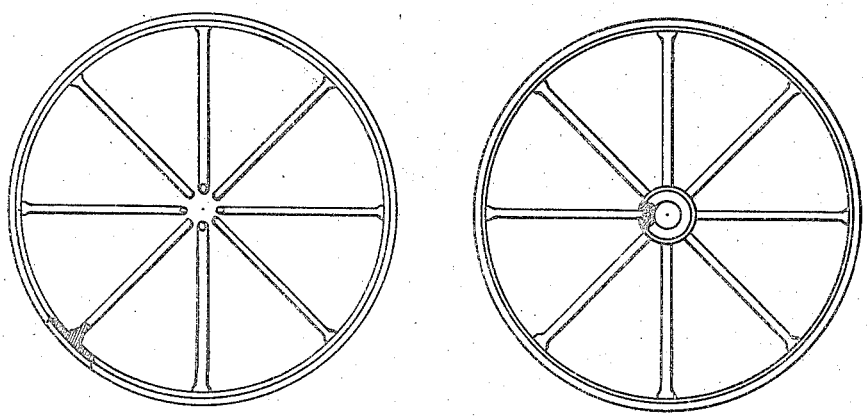
FIG-10- FIG-11-
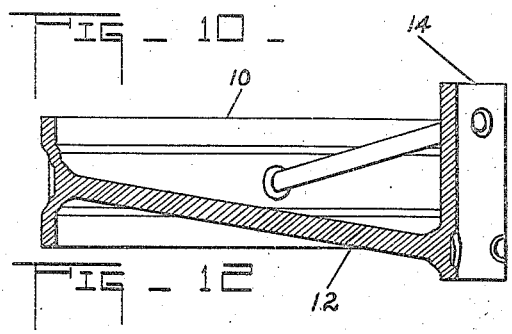
FIG-12
INVENTOR
Daniel W. Voorhees Jr.
BY
Jefft & Jefft
ATTORNEYS Patented Jan. 31, 1939

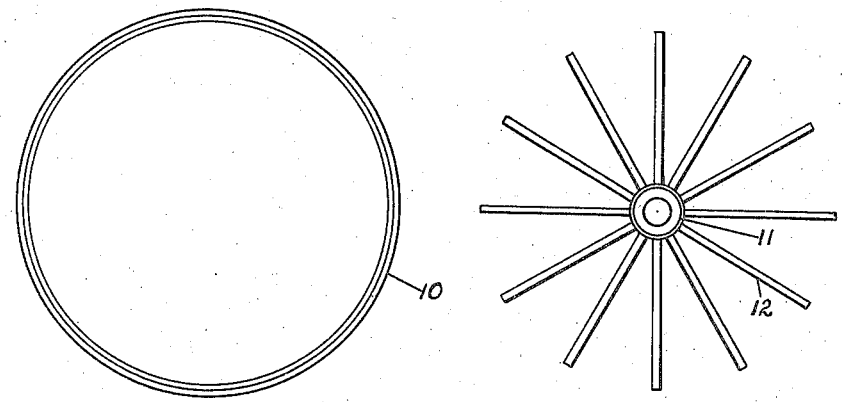

2,145,673

UNITED STATES PATENT OFFICE 2,145,673

METHOD OF MAKING A METAL WHEEL

Daniel W. Voorhees, Jr., Peru, Ill.

Application September 3, 1935, Serial No. 38,938

2 Claims. (Cl. 29—159.02)

This invention has reference to the art of making metal wheels and has for its principal object to provide a method of making metal wheels by a welding process.

Another object is to provide a method of constructing metal wheels which permits production thereof by a simplified welding process.

A further object is to provide a metal wheel construction, superior in sturdiness to conventional metal wheels, by a simplified process of manufacture and a saving in total weight of material.

Other objects will appear in the following description and accompanying drawings in which;

Fig. 1 is a side elevational view showing a metal wheel rim;

Fig. 2 is a plan view of the same;

Fig. 3 is a side elevational view showing a hub and spoke assembly;

Fig. 4 is a plan view of the same;

Fig. 5 is a side elevational view showing a step in the progress of assembly;

Fig. 6 is a side elevational view showing a completed wheel;

Fig. 7 is an enlarged fragmentary sectional view taken on line 7—7 in Fig. 6;

Fig. 8 is a side elevational view showing a step in the progress of assembly of one form of my wheel;

Fig. 9 is a similar view showing the parts in Fig. 8 formed into a completed wheel;

Figs. 10 and 11 are side elevational views showing a modified form of my wheel which will be referred to; and Fig. 12 is an enlarged fragmentary sectional view taken on line 12—12 in Fig. 9.

As is well known to those acquainted with the art of making metal wheels, the conventional process consists of riveting or otherwise attaching the spokes in a hub, providing holes in the rim, placing the spoke ends therein and riveting the ends over on the outer surface of the rim.

Many modifications of the above process have been presented on the market, but the basic idea has been the same.

Where wheels of great sturdiness are required the spokes are often provided with collars or flanges formed adjacent their ends and the final riveting process holds the rim or hub wall firmly against the collars so as to provide considerable strength at the joint.

Many processes for both hot and cold riveting or upsetting have been developed and used with the intention of lowering the cost of manufacturing or providing wheels of greater strength.

I herewith present an entirely new method and construction which provides a wheel having greater strength than that of the conventional wheel and one which is produced at relatively low manufacturing cost.

In carrying out my invention I provide a rim 10, Fig. 1, which may be of any suitable form or dimensions, and a spider structure such as that shown in Fig. 3, which includes a hub 11 and spokes 12.

It is here to be noted that I do not confine my invention to any particular arrangement or number of spokes or to any specific form or size of hub, or to any one means of attaching the spokes to the hub. The arrangement of spokes and proportions of the several parts, including the rim, are herein shown and described for illustration only.

Fig. 5 illustrates that the spider structure shown in Fig. 3 is so dimensioned as to be received in rim 10 with the ends of the spokes lying against or adjacent the inner surface of the rim.

With the parts in position, conventional electrodes are applied near the ends of the spokes and opposite electrodes are applied to the outer surface of the rim in registry with the spoke ends such as at 13 and 14 in Fig. 6.

Welding current is supplied through the electrodes, the process being well known, and pressure is applied at 14 whereby the metal of the rim is pressed inwardly into forced contact with the end of the spoke and welding of the spoke to the rim is accomplished.

During the welding process the metal at the end of the spoke and that adjacent the contacting rim portion is heated and softened thus making it relatively easy to distort the rim metal toward the spoke and continued movement toward the spoke has the effect of mashing or upsetting the spoke metal so as to form a contact surface of relatively large area and thus form a more perfect welded joint.

Fig. 7 shows in detail the one piece structure produced by the process.

The process outlined above may obviously be applied to attach the spokes to a hub as well as to the rim. In Figs. 8 and 9 I show a means of accomplishing this.

In the latter arrangement I provide the rim 10, a hub 14 preferably made from tubing, and spokes 12.

The spokes are made of such length as to be placed between the hub and rim as shown in Fig. 8 and the rim and hub metal is extended during progress of welding whereby the hub, spokes and rim are made integral, as shown in Fig. 12.

A structure may obviously be made up by the above method without extending the metal of both rim and hub. For example, the spokes may first be forced toward the rim and welded as shown in Fig. 10, thus making the spoke and rim integral without distortion of the metal of the rim.

With the spokes thus arranged, the structure may be placed in a mold and a hub cast around the inner ends of the spokes as shown in Fig. 11. In this manner a wheel is formed having integral spokes and rim, while the hub is firmly attached to the spokes by reason of its being cast around them.

It is to be noted that in wheels made by my process the spokes in the completed wheel are in tension. This is a desirable feature and is brought about by reason of the spokes being heated and expanded at the time welding action takes place. Subsequent cooling contracts the spokes, thus leaving them in tension. This would be true with the arrangement noted in connection with Fig. 11 as well as those shown in the other views. In the latter case heat from the molten metal of the hub is conducted to the spokes and final shrinkage of the hub and spokes brings about the tensioned condition.

The foregoing will indicate the novelty and adaptability of my method of making metal wheels. Modifications other than those described herein are obviously possible without alteration of principle. I do not wish to be limited except within the scope of the appended claims.

What I claim is:

1. The hereindescribed method of welding the spokes to the hub and rim of a wheel which consists in providing a rim having an annular bead midway between its side edges extending inwardly from the side portions thereof and presenting a substantially flat surface opposed to the ends of the spokes, maintaining the spokes in predetermined relative positions with their respective ends opposed to and spaced from the said bead of the rim, then simultaneously with the heating of the bead of the rim, to weld the same to the ends of the spokes opposed thereto, forcing the heated and softened portions of the bead of the rim progressively against the ends of the spokes with sufficient pressure to effect upsetting of the ends of the spokes during the final stages of the welding operations, the latter being performed without effecting distortion of the rim except within the confines of the bead and by effecting said upsetting of the spoke end.

2. The hereindescribed method of making an all metal wheel which consists in providing a hub member and wheel member disposed concentrically of each other, providing said hub and rim with opposed formations projecting toward each other to define spaces of less length than the radial distance between the bodies of the rim and the hub, disposing in said spaces spokes of less length than the latter and welding each thereof at one end to one of said members whereby to cause the other ends of said spokes to be spaced from the said formations of the other member, then heating said last-named ends of said spokes and the formations opposed thereto to welding heat and at the same time applying pressure to such formations and spoke ends to an extent sufficient to effect upsetting of the said spoke ends simultaneously with the completion of the welding operation.

DANIEL W. VOORHEES, Jr.